(12) United States Patent
Rainer

(10) Patent No.: US 8,147,007 B2
(45) Date of Patent: Apr. 3, 2012

(54) TRAVELING MECHANISM FOR AGRICULTURAL MACHINES AND OFF-ROAD VEHICLES HAVING AN ENDLESS BELT-BAND TRAVELING GEAR AND A CORRESPONDING BELT-BAND TRAVELING GEAR

(75) Inventor: Johann Rainer, Gottfrieding (DE)

(73) Assignee: Deere & Company, Moline, IL (US)

( * ) Notice: Subject to any disclaimer, the term of this patent is extended or adjusted under 35 U.S.C. 154(b) by 139 days.

(21) Appl. No.: 12/574,267

(22) Filed: Oct. 6, 2009

(65) Prior Publication Data
US 2010/0071969 A1 Mar. 25, 2010

Related U.S. Application Data

(63) Continuation of application No. 11/659,865, filed on May 27, 2007, now abandoned.

(30) Foreign Application Priority Data

Aug. 11, 2004 (DE) .................... 20 2004 012 552 U
Dec. 28, 2004 (DE) .................... 20 2004 020 124 U
Jul. 26, 2005 (DE) .......................... 10 2005 035 507

(51) Int. Cl.
*B62D 55/112* (2006.01)
*B62D 55/065* (2006.01)
(52) U.S. Cl. ......... 305/133; 305/130; 305/142; 180/9.5; 180/9.54
(58) Field of Classification Search .............. 305/124, 305/125, 129, 130, 132, 133, 134, 142, 143, 305/144, 145, 146, 148, 149, 153; 180/9.1, 180/9.5, 9.54, 6.54
See application file for complete search history.

(56) References Cited

U.S. PATENT DOCUMENTS

| 5,316,381 A | 5/1994 | Isaacson et al. |
| 5,340,205 A | 8/1994 | Nagorcka |
| 5,409,075 A | 4/1995 | Nieman |
| 5,503,238 A | 4/1996 | Urbanek et al. |
| 5,566,773 A | 10/1996 | Gersmann |
| 5,997,109 A | 12/1999 | Kautsch |
| 2001/0030068 A1 | 10/2001 | Nagorkca et al. |

FOREIGN PATENT DOCUMENTS

| DE | 19620759 | 12/1996 |
| DE | 20000737 | 4/2000 |
| DE | 19919959 | 11/2000 |
| DE | 60100536 | 3/2004 |
| WO | 9319975 | 10/1993 |

*Primary Examiner* — Kip T Kotter

(57) ABSTRACT

The invention relates to a spring-suspended, bearing force-optimized belt-band traveling gear (10) for ground vehicles, particularly for self-propelled agricultural machines and other off-road vehicles, comprising at least two outer deflection rollers (14, 15, 16, 17) over whose periphery an endless belt-band (22) rolls off, and at least one supporting roller (24) for supporting the belt-band section, which is in contact with the ground, between both deflection rollers (14, 15, 16, 17). A bogie truck (12, 13), in which the at least two deflection rollers (14, 15, 16, 17) are mounted in a manner that enables them to rotate, is supported against a body frame of the vehicle by means of a first fluidic suspension unit and/or damping unit. The at least one supporting roller (24) is supported on the bogie truck (12, 13) by means of a second fluidic suspension unit and/or damping unit. A fluidic coupling of the suspension units and/or damping units of the bogie truck (12, 13) is provided against the vehicle frame and the at least one supporting roller (24) mounted on the bogie truck (12, 13).

12 Claims, 7 Drawing Sheets

US 8,147,007 B2

TRAVELING MECHANISM FOR AGRICULTURAL MACHINES AND OFF-ROAD VEHICLES HAVING AN ENDLESS BELT-BAND TRAVELING GEAR AND A CORRESPONDING BELT-BAND TRAVELING GEAR

CROSS-REFERENCE TO RELATED PATENT APPLICATION

This application is a continuation of U.S. patent application Ser. No. 11/659,865, filed May 27, 2007, which application is hereby incorporated by reference in its entirety.

FIELD OF THE INVENTION

The present invention relates to a traveling mechanism for agricultural machines and off-road vehicles having an endless belt-band traveling gear. The invention further relates to a belt-band traveling gear, particularly a spring-mounted, belt-band traveling gear with optimum bearing strength specifications, the belt-band traveling gear being suitable inter alia for self-propelled agricultural machines and other off-road vehicles. Furthermore, the invention relates to a ground vehicle having a spring-mounted belt-band traveling gear with optimum bearing strength specifications.

BACKGROUND OF THE INVENTION

Ground vehicles used in agriculture usually comprise pneumatic tires, which create the interface to the ground. The tires have to support the weight of the vehicle on the one hand while providing the required traction on the other. In very heavy vehicles, for example, in self-propelled harvesters, relatively high surface pressures result below the contact surfaces in spite of very broad tires with six or more individual wheels. These high surface pressures can lead to an impermissibly high soil compaction especially in wet farmlands. Even a reduced internal pressure of tires cannot change much about this problem since in the case of a clearly reduced tire pressure as would be desirable per se for traveling on soft or wet farmlands, the load on the tires is reduced as a result of which the weight of the vehicle can no longer be supported. This relates particularly to vehicles having a greatly fluctuating weight such as e.g. root crop harvesters or the like.

Chain traveling gears or belt-band traveling gears represent a possible alternative for wheeled traveling mechanisms since the effective contact surface can be increased distinctly using a traveling gear of this type, thus enabling an improved transmission of the fraction force on soft and wet farmlands to be realized in most cases. Due to the increasing requirement of protecting the ground and particularly the farmlands used for agriculture from excessively high weight loads resulting from machines and vehicles, those vehicles are being used increasingly which comprise suitable belt-band traveling gears instead of drive wheels and support wheels having pneumatic tires. This is because the former offer a larger contact surface as compared to the tread contacts of rubber wheels and additionally promise an improved traction force on the soft ground. In practice, those traveling gears are used exclusively, in which either all the carrier rollers and deflection rollers are mounted rigidly on a bogie or at most individual small carrier rollers are linked using spring mounting. The reason for this is that the belt-band traveling gears known from prior art require very high pretensioning forces of the belts in order to absorb sufficiently large loads between the carrier rollers. Therefore the hitherto known belt-band traveling gears comprise deflection rollers that are mostly rigidly mounted.

The typical disadvantage of these rigidly mounted deflection rollers is a very limited driving and rolling comfort as compared to a wheeled traveling mechanism, particularly during on-road operation. An additional serious disadvantage of the traveling gears known from prior art is that the resulting contact loads cannot be distributed uniformly on all the carrier and deflection rollers. There exists a uniform load distribution only in the ideal case of absolutely even ground conditions. However, if one carrier roller runs on a bump, the carrier roller is overloaded and the load on the other carrier rollers is relieved resulting in turn in high loads on the grounds.

A traveling mechanism for agricultural machines having resilient belts is known from U.S. Pat. No. 5,409,075 A, in which the track rollers supported on the ground each have a pneumatic suspension system. The pneumatic suspension elements are coupled to one another on the pressure side in order to enable the most uniform possible pressure distribution of the contact surface of the track rollers and the belt in the case of varying ground conditions and ground unevenness.

Another traveling mechanism for agricultural machines having resilient belts is disclosed in DE 196 20 759 A1. The track rollers of the traveling mechanism are each suspended on rocker arms, which are supported against the frame by means of hydraulic control elements. The hydraulic control elements are coupled to one another in an action-oriented manner in order to achieve a spring effect and to be able to ensure constant ground pressures of the track rollers with varying ground factors and ground unevenness.

Finally, DE 601 00 536 T2 describes a belt-band traveling gear for an agricultural tractor, which belt-band traveling gear is supposed to enable an adjustment to varying ground conditions and ground unevenness by means of a spring suspension of the track rollers and the track roller frames. The suspension system comprises several air spring systems by means of which each of the front and rear crawler frames or the individual track rollers are supported.

The known spring systems for belt-band traveling gears or chain traveling gears enable an improved pressure distribution of the effective traveling mechanism contact surfaces between the outer deflection rollers in the case of an uneven ground surface by means of the resiliently suspended track rollers. However, they do not enable any uniform pressure distribution over the entire length of the traveling gear, as a result of which very high pressure peaks are transmitted partially in the farmlands even in the case of traveling mechanisms known from prior art.

SUMMARY OF THE INVENTION

A priority objective of the present invention is to avoid the afore-mentioned disadvantages and to provide a belt-band traveling gear, which enables a more uniform ground loading and additionally offers increased driving and rolling comfort.

A spring-mounted belt-band traveling gear with optimum bearing load specifications for ground vehicles comprises at least two outer deflection rollers, over whose periphery an endless belt rolls off and also at least one support wheel or a supporting roller for supporting the belt section which is in contact with the ground, between both the deflection rollers. Both the deflection rollers are mounted in a bogie in a manner that enables them to rotate, which bogie is supported against a body frame of the vehicle by means of a first fluidic suspension and/or damping unit. The at least one supporting roller is supported on the bogie by means of a second fluidic suspension unit and/or damping unit.

The belt-band traveling gear according to the present invention comprises a fluidic coupling of the first fluidic suspension and/or damping unit, by means of which the bogie is supported against the chassis frame, with the second suspension and/or damping unit, by means of which the at least one supporting roller is mounted on the bogie.

Although the term "endless belt-band" has been mostly used in the present invention to mean a belt-band, it can also be meant to connote e.g. a resilient belt of suitable material—especially an elastomer material with or without reinforcing fabric inserts or wire inserts. However, a crawler or the like which can optionally be provided with damping supports can also be used as a belt within the scope of the present invention.

The fluidic suspension and/or damping units within the meaning of the present invention can be, e.g. lever units, which are supported by means of suitable fluid cylinders with a springy or damping effect. A pure suspension system can be implemented e.g. by means of a gas filling as the circumflowing fluid. In this case, additional damping units, e.g. hydraulic dampers or mechanical (friction) dampers or the like could be provided, if necessary. The fluidic suspension and/or damping units could also be a part of a hydropneumatic suspension and/or damping system, in which the relatively slow circumflow times of a hydraulic fluid are used for vibration damping and in which the rapid response behavior and the compressibility of a suitable pressure gas are used for implementing a desired springing effect.

The belt-band traveling gear according to the present invention having the characteristics of the independent claim comprises at least two carrier or deflection rollers of the traveling gear which are mounted by means of rockers or another suitable bearing on the bogie in a manner that enables them to rotate. Naturally more than two deflection rollers can also be provided if this is expedient and if the corresponding installation space is available. The corresponding portion of load is applied on the individual carrier rollers preferably by means of suitable supporting elements, e.g. the fluidic units mentioned above or suitable supporting cylinders. The carrier and deflection rollers, over which the endless belt-band is tensioned, are preferably connected rigidly to the bogie or have a belt tension device integrated therein.

The belt-band traveling gear can be e.g. a triangular traction unit comprising a central or laterally offset, overhead drive wheel. Such a triangular traction unit is particularly suitable for being adapted to already existing wheel suspensions in order to make a partly or completely crawler-mounted vehicle from a wheeled vehicle.

In one design form of the present invention, the belt-band traveling gear comprises two or more supporting rollers of the same or varying size, which are each arranged between both the deflection rollers for supporting the belt section, which is in contact with the ground. Depending on the required length of the load-bearing section of the belt, almost any number of supporting rollers can be arranged between both the outer carrier or deflection rollers which are supported preferably individually or also in pairs or groups against the bogie by means of second fluid elements.

Furthermore, in a preferred variant of the present invention, the supporting rollers are each suspended or mounted so as to enable a definite twist of the preferably resilient belt. This can be possible by means of a suitable swivelability of the rotation axes of the supporting rollers about a real or virtual swivel axis oriented approximately parallel to the longitudinal direction of the vehicle. In a sufficiently resilient belt, it is possible in this manner to prevent the belt from digging into the ground with only one load-bearing edge in the case of a greatly uneven ground. The pivoting angle of the supporting rollers can be limited, if necessary, in order to reliably prevent the belt from wearing.

Optionally, it is also possible to actively influence this swivelability of the individual supporting rollers by which an improved traction can be achieved in certain driving situations. Thus it can be expedient to press the edges of the belt lightly into the slope e.g. during a drive along a slope, in order to create a certain cant of the belt with the ground and in order to thus prevent the vehicle from slipping or drifting off. This cant of the belt can be supported firstly by the above-mentioned horizontal deviation of individual or all the carrier rollers, by their intensified pressurization (see explanation below) or also by a combination of both the control interventions.

In addition, it can also be expedient for the bogie or the two, three, four or more bogies themselves to be gimbal-mounted or suspended in any another way in order to enable a slope compensation for the vehicle body. This slope compensation can be effected optionally by means of inclination sensors and associated settling circuits or manually by the driver.

In order to implement a largely uniform load distribution on all the carrier and deflection rollers, the vehicle axle load to be supported is initially transmitted in a suspension arranged on the bogie, e.g. a rocker connected to the bogie in a manner that enables said rocker to rotate. This rocker is then in turn supported against the bogie by means of one supporting cylinder or an appropriately constructive design of several supporting cylinders to prevent said rocker from twisting. Corresponding to the applied axle load, a system pressure dependent thereon is built up in the supporting cylinder/s, which usually are hydraulic or pneumatic cylinders.

In one design form according to the present invention, this system pressure is now used for being applied to respective pistons of the supporting cylinders of the carrier rollers and to apply the same portion of axle load to every carrier roller taking into consideration all the lever length and cylinder piston active or working surface area ratios. This means that e.g., in a bogie with a total of five carrier and deflection rollers, altogether three carrier rollers are mounted on the bogie by means of one rocker each so as to enable them to rotate and are supported by means of supporting cylinders. The active or working surface area of each piston of each supporting cylinder for the traveling gear rocker for absorbing the axle load and the active or working surface areas of each of the pistons of the three supporting cylinders for the rotatably mounted carrier rollers must then be chosen relative to the rockers for the carrier rollers taking the lever ratios into account so as to be able to support $\frac{1}{5}$ of the applied axle load on each carrier roller in the case of the same system pressure acting against the working surface area of each piston in all of the cylinders. The advantage of a uniform ground loading over the entire contact surface of a belt-band traveling gear is thus ensured.

In another design form according to the present invention, an accumulator—usually a hydropneumatic reservoir—can be connected to the mutually supporting cylinder system to form a fluidic coupling. Thus, a springy effect is also achieved advantageously and a corresponding belt-band traveling gear is decoupled from the associated vehicle frame, so that the highest driving and rolling comfort is possible.

According to the present invention, and for absorbing all the occurring forces on a belt-band traveling gear, the rocker designed for absorbing and transmitting said forces in the bogie must have a defined width and lever lengths that are intended for taking up distances to be specified. Thus, the given space conditions within a traveling gear are then exceeded under certain circumstances. In a design form according to the present invention, the rocker is then attached so as to be offset laterally by a required measure, preferably towards the center of the vehicle. The operating mode of the overall system is however not affected thereby.

Varying operating conditions can be realized for a belt-band traveling gear by means of another design form of the pressure system—usually a hydraulic system according to the present invention. Thus, during on-road operation the traveling gear is preferably operated with a spring effect, in which an accumulator is connected. Since the system pressure also increases or drops in the case of a varying axle load, it may be expedient, e.g. to detect the displacement of the rocker for absorbing the axle load and to accordingly track the fluid volume in the system by means of a corresponding pressure source and power source. This practically corresponds to a level control system as has been realized already many times and therefore need not be described further.

A variant according to the present invention can provide an amplitude-dependent variation of the spring rate. Here, e.g., two or more accumulators can be provided which can be connected or disconnected depending on the load condition of the vehicle. Thus e.g. an amplitude of the traveling gear rocker can be detected. The vibration amplitude normally increases in the case of a larger vehicle load and greater ground unevenness and higher travel speed. This can be counteracted by stiffening the pressure fluid system particularly by decoupling one of several accumulators. A finer adjustment can be carried out by variably disconnecting one, two, or more accumulators from the pressure fluid system so as to achieve a variable spring rate, which can be adapted to varying driving and operating conditions. Optionally, the variations mentioned above can also be made during travel particularly by means of a suitable settling circuit.

If a disconnection of the suspension system is desired, this is possible easily by disconnecting the accumulator or separating it from the remaining hydraulic system. This can be the case e.g. if a harvester is equipped with the automatic depth control of a header and the control mode could also be influenced negatively by a suspension. Usually there is also no requirement of tracking the system volume in this operating condition since there occur no volume changes in the case of varying system pressure in a then closed system formed between supporting cylinders of the axle rocker and supporting cylinders of the carrier rollers. The sum of the volumes remains constant.

Another advantage is achieved according to the present invention by decoupling the supporting cylinders and impinging the rotatably mounted carrier rollers by a pressure source deliberately so that these carrier rollers are loaded or relieved of load accordingly. Thus it can be advantageous, e.g. on a side slope, to shorten the contact surface of the bogie by loading the middle carrier rollers more heavily than the front and rear carrier rollers so as to largely be able to prevent a lateral slippage on the slope. This variant also can be equipped in turn with or without suspension.

The belt-band traveling gear according to the present invention is particularly suitable for self-propelling agricultural work machines, for forest machines and construction machines and also for other commercial vehicles and transport vehicles, which can be used on soft, resilient and/or uneven grounds and also on impassable terrains. The advantages of the vehicles having conventional wheeled traveling mechanisms, namely their flexibility, their relatively good maneuverability and the relatively high travel speed are predominantly influential during on-road operation or when traveling on paved dry grounds. In contrast, wheeled traveling gears reach their limits in the case of very high vehicle weights.

The disadvantages usually associated with belt-band traveling gears, namely the transmission of relatively high shearing forces during the transfer of high traction forces, relatively poor maneuverability, low travel speed, high wear of the belts and last but not least the loss of comfort and the strong tendency of the vehicle to jump and rock, can be prevented largely with the present invention as a result of which the belt-band traveling gear according to the present invention enables a versatile use of such traveling gears for the most different types of vehicles and applications. This was not the case in the hitherto known systems or was achievable only with high design-related expenditure.

In addition, the belt-band traveling gear according to the present invention enables a very easily realizable, automatically controllable or manually adjustable slope compensation since a certain inclination can be compensated during travel uphill or downhill by a corresponding pressurization of the traveling gear supporting cylinders. A camber compensation of the vehicle body can be achieved in an additional gimbal-mounted suspension or any other suitable suspension of the bogie preferably on the left and right side each independent of the other. This firstly leads to an improved driving comfort and secondly an increased tilt resistance and improved traction.

In addition, the present invention relates to a traveling mechanism, which is equipped with at least two belt-band traveling gears according to one of the previously described embodiments. A vehicle provided with such a traveling mechanism could optionally comprise two, three, four or more such belt-band traveling gears. Thus e.g. an arrangement with two rear belt-band traveling gears and one or two front, steerable, pneumatic wheels is possible. Naturally, special-purpose vehicles are also feasible which comprise only one rear preferably centrally arranged belt-band traveling gear according to one of the previously described embodiments and two front wheels. Traveling mechanisms with four belt-band traveling gears, of which two or even all are steerable, are also possible. Numerous modifications and variations are possible depending on the desired application of the vehicle or the traveling mechanism.

DESCRIPTION OF THE EXEMPLARY EMBODIMENTS

The present invention shall now be explained in detail on the basis of a preferred exemplary embodiment with reference to the attached drawings. The example serves for illustrating the invention. However, it is by no means to be construed as a restriction of the invention. Identical parts and parts performing identical functions are denoted by the same reference numerals; repeat explanations have been avoided to some extent.

FIG. 1 shows the schematic diagram of a first variant of a basic structure of the belt traveling gear 10, the basic structure being selected in the form of an isosceles triangle here, since this is an advantageous form with regard to the installation space in an agricultural vehicle (not illustrated).

Figure 1:
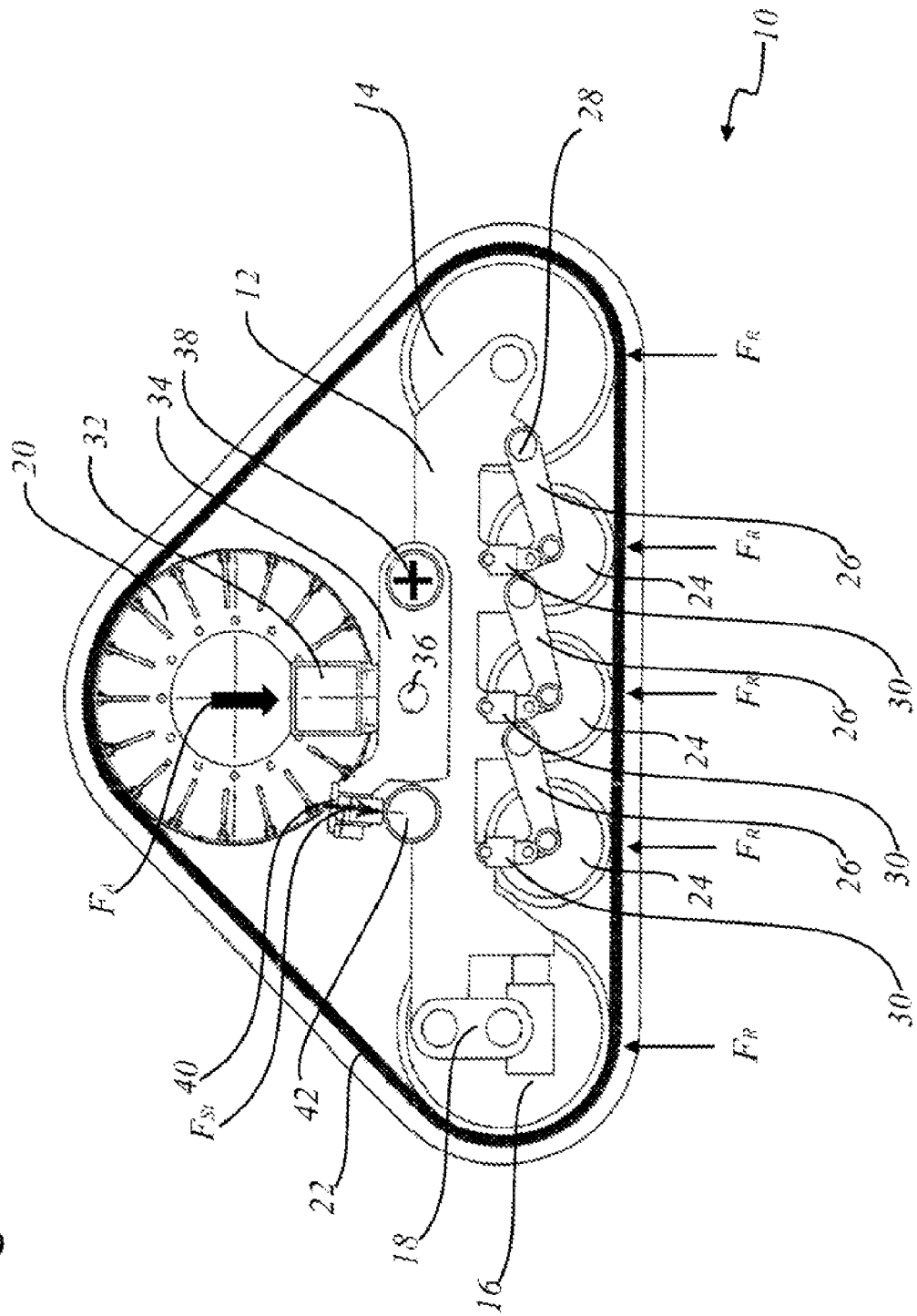
FIG. 1 shows a schematic drawing of a basic structure of a variant of the belt-band traveling gear according to the present invention.

The figure shows the lateral view of the bogie 12 on which the rear carrier and deflection roller 14 and the front carrier and deflection roller 16 are fitted tightly and mounted in a manner that allows them to rotate. In the exemplary embodiment illustrated, the front carrier and deflection roller 16 is provided with a suitable clamping device—here a suitable clamping cylinder 18. Between both the outer rollers 14 and 16 and with its rotation axis arranged above the clamping cylinder there lies a drive wheel 20 on the bogie 12, which drive wheel is to be designed according to the driving type selected e.g. mechanical or even hydraulic, but is not illustrated in detail here.

The wrapping of the preferably resilient belt 22 around the drive wheel 20, carrier and deflection roller at the front 16 and carrier and deflection roller at the back 14 results in the basic shape of the belt-band traveling gear 10. Furthermore, small supporting rollers or carrier rollers 24 are visible which are each mounted on associated rockers 26 in a manner that enables them to rotate about rotation axes 28. The carrier rollers 24 are each then supported against the bogie 12 by means of a supporting cylinder 30 assigned to each carrier roller and by means of the rockers 26.

Furthermore, in FIG. 1 a carrying axle 32 of a frame of any vehicle can be seen which transmits the axle load $F_A$ into the rocker 34 of the traveling gear by means of a rotary bearing 36 using which the traveling gear rocker 34 is supported against the traveling mechanism carrying axle 32. It can also be seen that the bogie 12 of the belt-band traveling gear 10 is mounted on the rocker 34 of the traveling gear in a manner that enables the bogie 12 to rotate about the rotation axis 38. It is further apparent that the traveling gear rocker 34 is supported by means of the traveling gear supporting cylinder/s 40 on a supporting axle 42, thus preventing said traveling gear rocker from twisting due to the transmitted axle load $F_A$. Depending on the design, the rotation axis 38 of the traveling gear rocker and the supporting axle 42 are either a component of the bogie 12 or fixedly connected thereto. Thus according to the invention the transmitted axle load $F_A$ can be transmitted tin the bogie 12 by the supporting force $F_{ST}$ applied by the traveling gear supporting cylinder 40 and the connection of the traveling gear rocker 34.

Figure 5:
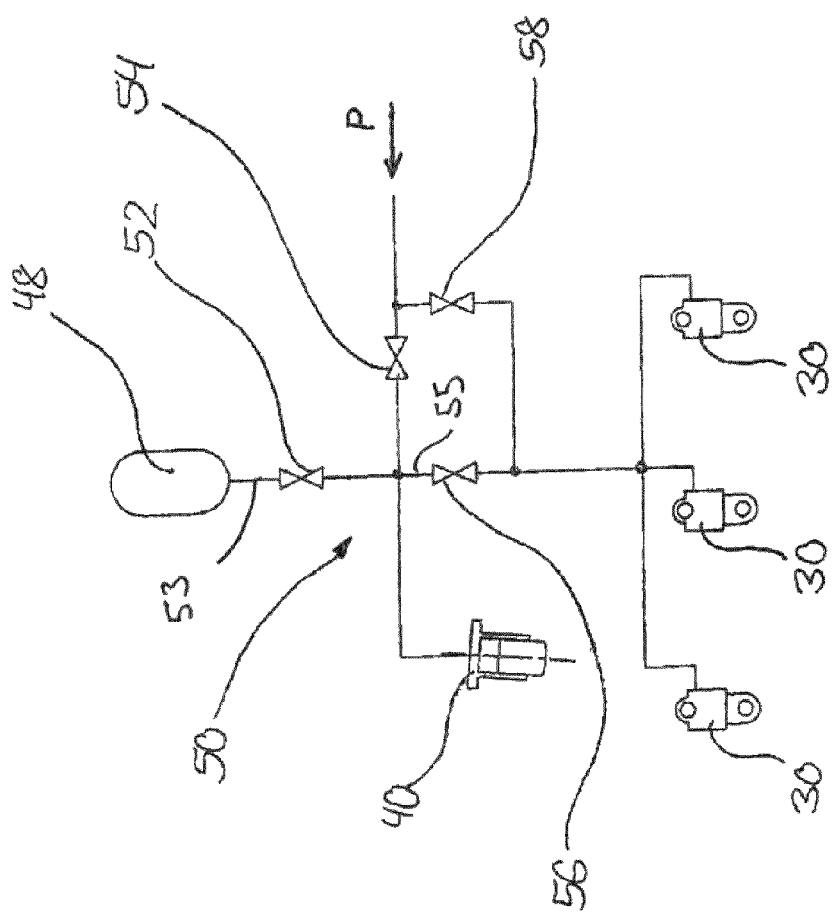
FIG. 5 shows a possible structure of the piping of a fluidic coupling for connecting the elements of the belt-band traveling gear based on a schematic block diagram.

According to the present invention, depending on the axle load $F_A$, the lever ratios and the selected cylinder surface, a system pressure is built up in the traveling gear supporting cylinder 40 for achieving the supporting force $F_{ST}$ on the traveling gear, which system pressure then in turn for impinging the supporting cylinders 30 for the carrier rollers 24 by means of a piping and hose line system (not illustrated in detail here) as is shown schematically in FIG. 5 by way of example.

If all the lever and active surface ratios are configured appropriately in this system, the transmitted axle load $F_A$ is distributed uniformly on all the carrier rollers 24 and also the front carrier and deflection roller 16 and the rear carrier and deflection roller 14 from which there results a uniform contact load $F_R$ of the carrier and deflection rollers 14, 16 and 24.

Figure 2:
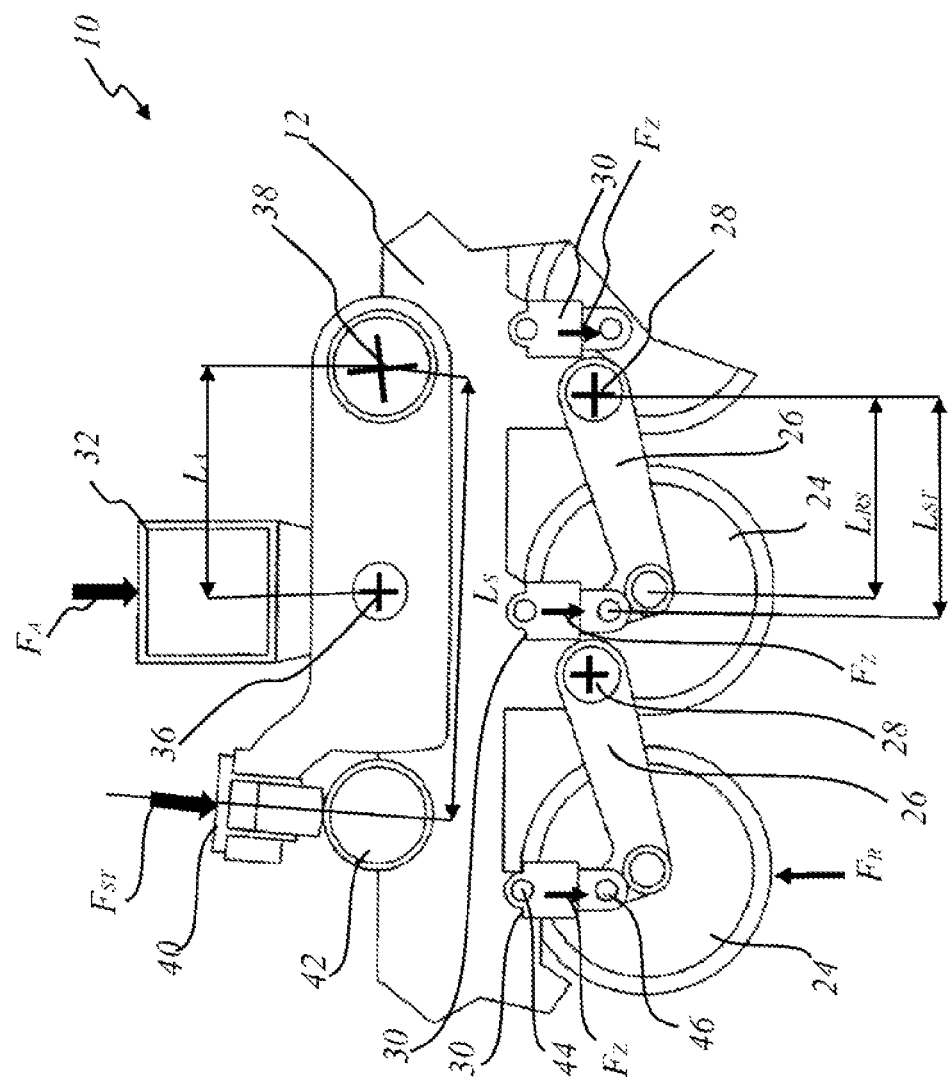
FIG. 2 shows a schematic drawing of a section of the basic structure of the belt-band traveling gear shown in FIG. 1.

FIG. 2 schematically shows a section of the basic structure of a belt-band traveling gear 10 shown in FIG. 1. On the basis of the drawing, it can be seen how the axle load $F_A$ is transmitted in the traveling gear rocker 34 according to the invention by means of the rotary bearing 36 of the carrying axle. Furthermore, the rotation axis 38 of the traveling gear rocker 34 is mounted rotatably on the bogie 12. The supporting cylinder 40 connected to the traveling gear rocker 34 is supported against the supporting axle 42 of the bogie 12 and thus prevents the traveling gear rocker 34 from twisting.

A supporting force $F_{ST}$ is generated on the traveling gear, which supporting force is dependent on the lever length (axle load) $L_A$ and the lever length (support load) $L_S$ and also the axle load $F_A$ transmitted by means of the traveling mechanism carrying axle 32. The system pressure required for the supporting force $F_{ST}$ on the traveling gear results on the basis of the selected cylinder diameter for the traveling gear supporting cylinder/s 40 and the active surface resulting therefrom.

The connection of the carrier rollers 24 to the bogie 12 by means of the carrier roller rockers 26 and the rotation axes 28 of the rockers and also the support of the carrier roller rockers 26 against the bogie 12 by means of the supporting cylinders 30 for the carrier roller 24, the supporting cylinders 30 being mounted in the rotary axes 44 on the bogie 12 and the rotation axes 46 on the rocker 26, are also shown according to the invention.

By means of the system pressure built up in the traveling gear supporting cylinder 40 and transmitted by means of a corresponding piping (not illustrated) to the carrier roller supporting cylinders 30, these support cylinders 30 generate a corresponding supporting force $F_Z$ on the respective carrier roller 24 so that taking account of the lever length $l_{RS}$ of the carrier roller rocker and the lever length $l_{ST}$ between the rotation axis 28 and support cylinder 30, a contact load $F_R$ of the carrier and deflection rollers is created that is equal for all the carrier and deflection rollers.

Figure 3:
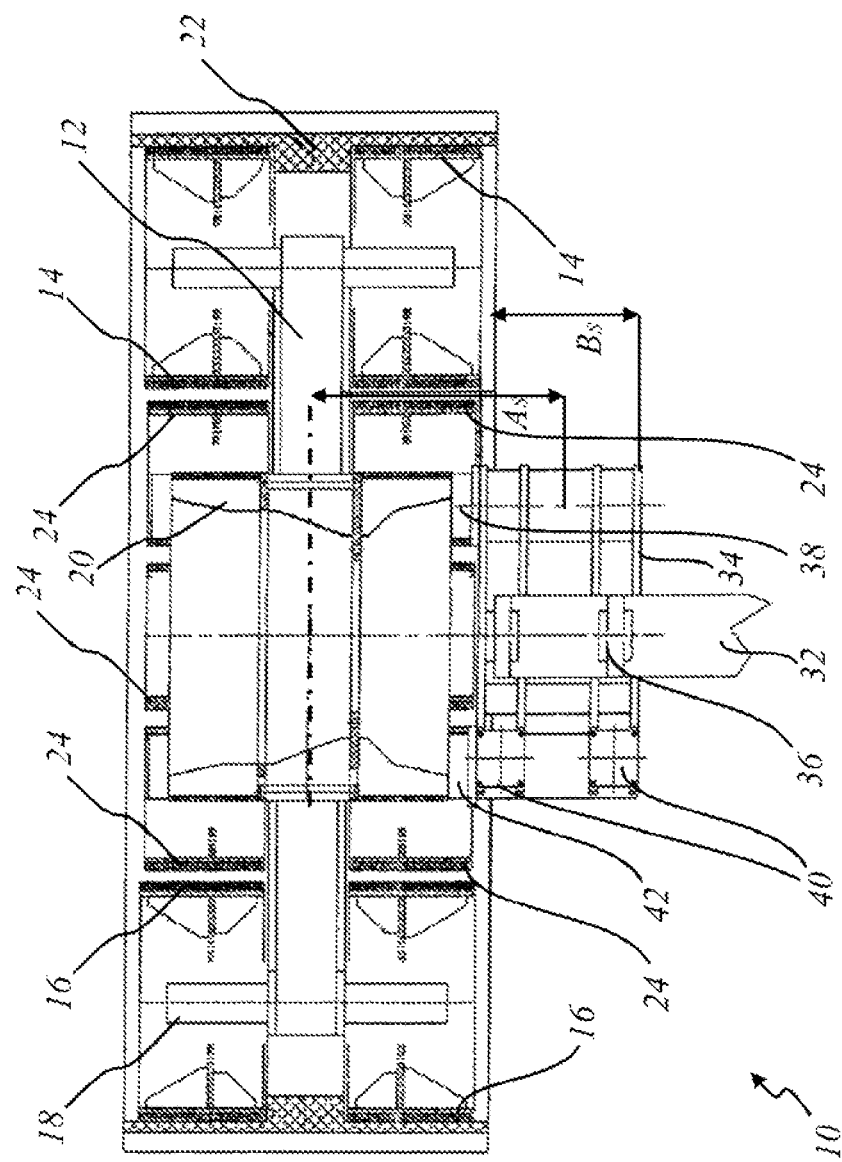
FIG. 3 shows a schematic sectional view of the belt-band traveling gear.

The schematic drawing of FIG. 3 shows a sectional view of the belt-band traveling gear 10 in a plan view so that it is apparent that, e.g. in the exemplary embodiment shown in FIG. 1, the traveling gear rocker 34 has a broad rocker width $B_S$ for absorbing all the acting forces. Due to the arrangement of the drive wheel 20, it is necessary in this case to offset the traveling gear rocker 34 then by a distance $A_S$ between the rocker and the center of the traveling gear 10. It makes sense to offset the traveling gear rocker 34 towards the center of the vehicle. The connection to the bogie 12 is effected by the appropriately designed rotation axis 38 of the traveling gear rocker 34 and the supporting axle 42 of the bogie 12. Due to the broad rocker width $B_S$, it is also possible to attach several traveling gear supporting cylinders 40 according to FIG. 3, two supporting cylinders 40 being attached in the exemplary embodiment illustrated.

Figure 4:
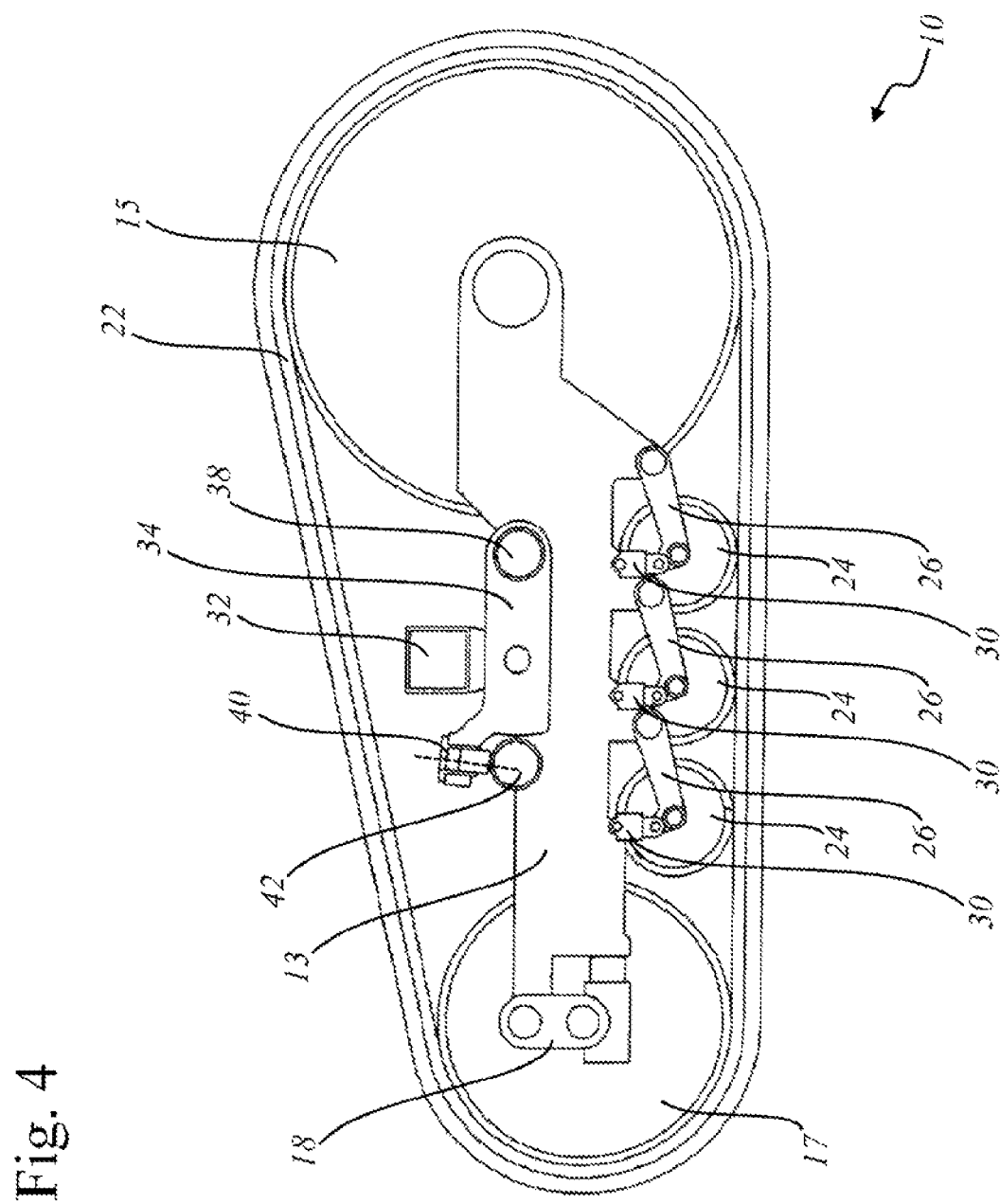
FIG. 4 shows a lateral view of another variant of the belt-band traveling gear.

The schematic drawing of FIG. 4 further shows a lateral view of the spring-mounted belt-band traveling gear 10 with optimum bearing load specifications in an alternative embodiment, namely in a wedge-shaped formation. The figure shows that by means of a front carrier and deflection roller 17 of smaller diameter and a larger rear carrier and deflection roller 15 which can also simultaneously serve e.g. as a drive roller, a belt-band run can be drawn which permits the installation of the traveling gear rocker 34 centrally above the bogie 13 in the case of a bogie 13 that is likewise adapted to the requirements, so that there is no distance $A_S$ between the rocker and the center of the traveling gear (c.f. FIG. 3) or that this distance is equal to zero.

The remaining elements of the exemplary embodiment shown in FIG. 4 correspond to the components described already based on FIGS. 1 to 3 and shall therefore not be explained again.

On the basis of a schematic block diagram; the schematic drawing of FIG. 5 shows a basic fluidic system 50 including the basic structure of a possible piping and hose line system for connecting all of the fluidic or hydraulic elements together for selectively initiating the various possible operating conditions of the belt-band traveling gear according to the present invention. It is apparent how the traveling gear supporting cylinder/s 40 or first fluidic suspension or damping unit, the carrier roller supporting cylinders 30, or second fluidic suspension or damping unit, an accumulator 48 and a pressure source P are initially interconnected according to the present invention by means of the piping and hose line system of the fluidic system 50. Valves 52, 54, 56 and 58 define a fluid control arrangement and are integrated in the piping and hose line system of the fluidic system 50, as is shown here schematically, with valve 56 directly connecting the cylinder/s 40 comprising the first fluidic suspension or damping unit with the cylinders 30 comprising the second fluidic suspension or damping unit. By directly is meant that no functional component, such as, for example, an accumulator or pneumatic spring, is between the cylinder/s 40 comprising the first fluidic suspension or damping unit and the cylinders 30 comprising the second fluidic suspension or damping unit although a pipe connection may be present.

In the case of the occurring high loads of agricultural machines, this system can advantageously be a hydraulic system. However, the pressure system can comprise a gas or air as a pressure medium. The following operating conditions of the belt-band traveling gear 10 are possible according to an exemplary embodiment of the present invention. If at first only the supporting cylinders 30 and 40 and also the accumulator 48 are interconnected, i.e. valves 52 and 56 are open, valves 54 and 58 are closed, then an axle load is distributed uniformly on the carrier rollers and an active suspension of the overall system is achieved simultaneously with the help of a hydropneumatically designed accumulator 48. In the case of a constant axle load, the pressure source P need not be necessarily connected since there exists an approximately constant system pressure in the closed system. However, if the axle load changes, e.g. due to an increasing loading of a harvester, the system pressure increases and the fluid volume is displaced in the case of an active suspension in the accumulator 48. It is then expedient to track the volume by means of the pressure source P (valve 54 open). This can take place using control engineering by detecting the stroke of the traveling gear rocker 34.

Detailed description of this will not be necessary since this is known from prior art and practically represents a type of level control system.

On the other hand, if an active suspension of the overall system is not desired, then the active suspension can be disconnected by disconnecting the accumulator 48 (valve 52 closed). Then only one fluid volume is exchanged between the supporting cylinders 40 and 30 according to the carrier roller movement, in the case of a system pressure determined by the axle load. The uniform distribution of the axle load is thus unaffected thereby.

If certain operating conditions or driving situations require the central carrier rollers 24 to be loaded or relieved of load, then this can take place by separating the traveling gear supporting cylinder 40 from the carrier roller supporting cylinders 30. The valves 56 and 54 are closed in doing so and valve 58 opens. Thus the loading of the carrier rollers 24 can be controlled by means of the pressure source P. Thus, e.g. on a laterally slanted ground (slide slope), an increased loading of the carrier rollers located down-slope can take place so that the contact surface of the traveling gear is shortened, which can be advantageous to prevent lateral slippage or drifting. Simultaneously, the accumulator 48 can be connected to or disconnected from the traveling gear supporting cylinder 40 by opening or closing the valve 52, which in turn corresponds to an operating condition with or without active suspension.

In one embodiment, valve 52 in line 53 connects accumulator 48 with the traveling gear supporting cylinder/s 40 and the carrier roller supporting cylinders 30 which respectively comprise the first and second fluidic suspension or damping units; and single valve 56, disposed in line 55, interconnects the first fluidic suspension or damping unit with the second fluidic suspension or damping unit. Accumulator 48 also can be pneumatic, a hydraulic and/or a hydropneumatic pressure reservoir.

Figure 6:
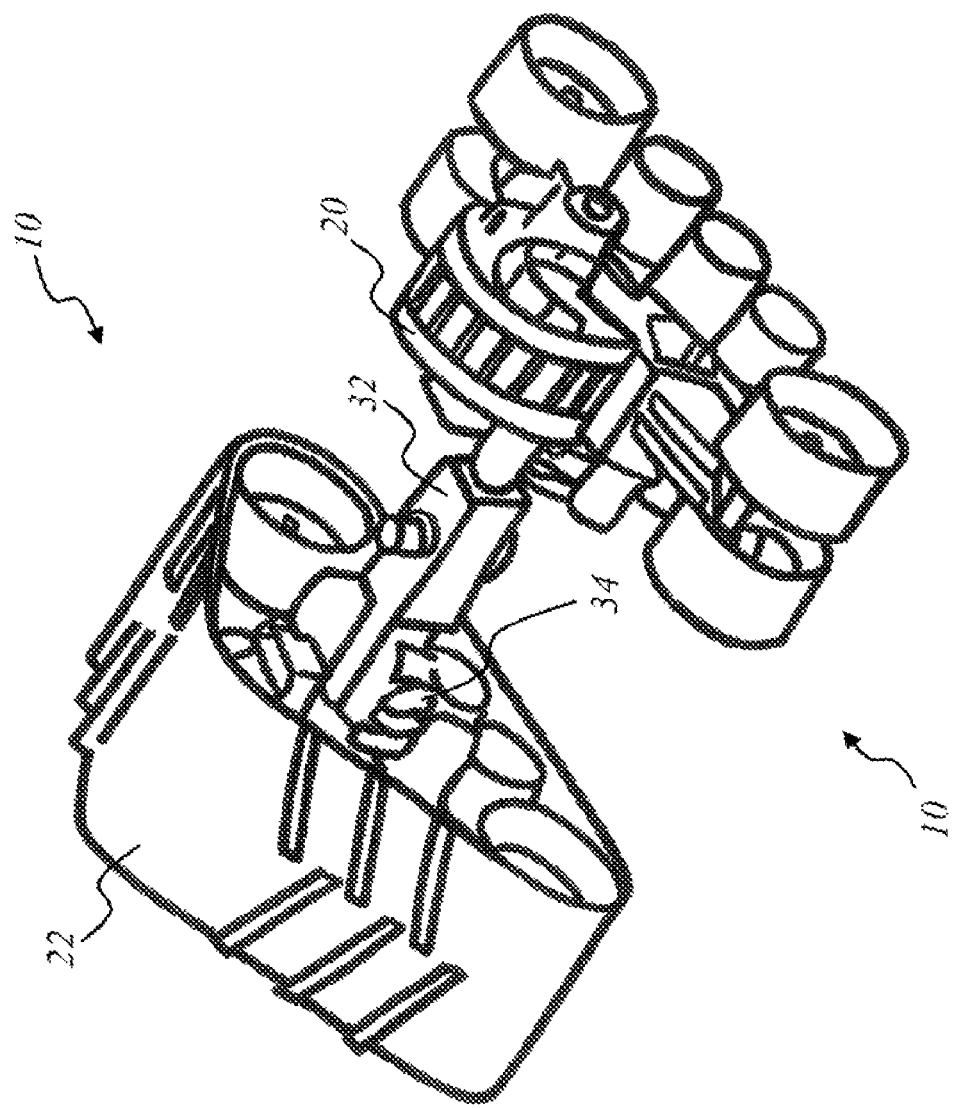
FIG. 6 shows a schematic perspective view of a rigid vehicle axle equipped with two belt-band traveling gears according to the present invention.

The schematic perspective view of FIG. 6 illustrates a rigid vehicle axle 32, which is equipped with two belt-band traveling gears 10 according to the invention corresponding to the variant of the embodiment shown in FIGS. 1 to 3. It is apparent that instead of conventional wheels with pneumatic tires, the drive wheels 20 of the respective left and right belt-band traveling gears 10 are now connected to the hubs of the rigid carrying axle 32 of the vehicle. The belt-band traveling gears 10 according to the present invention are thus basically suitable for the universal backfitting of existing wheeled traveling mechanisms.

Figure 7:
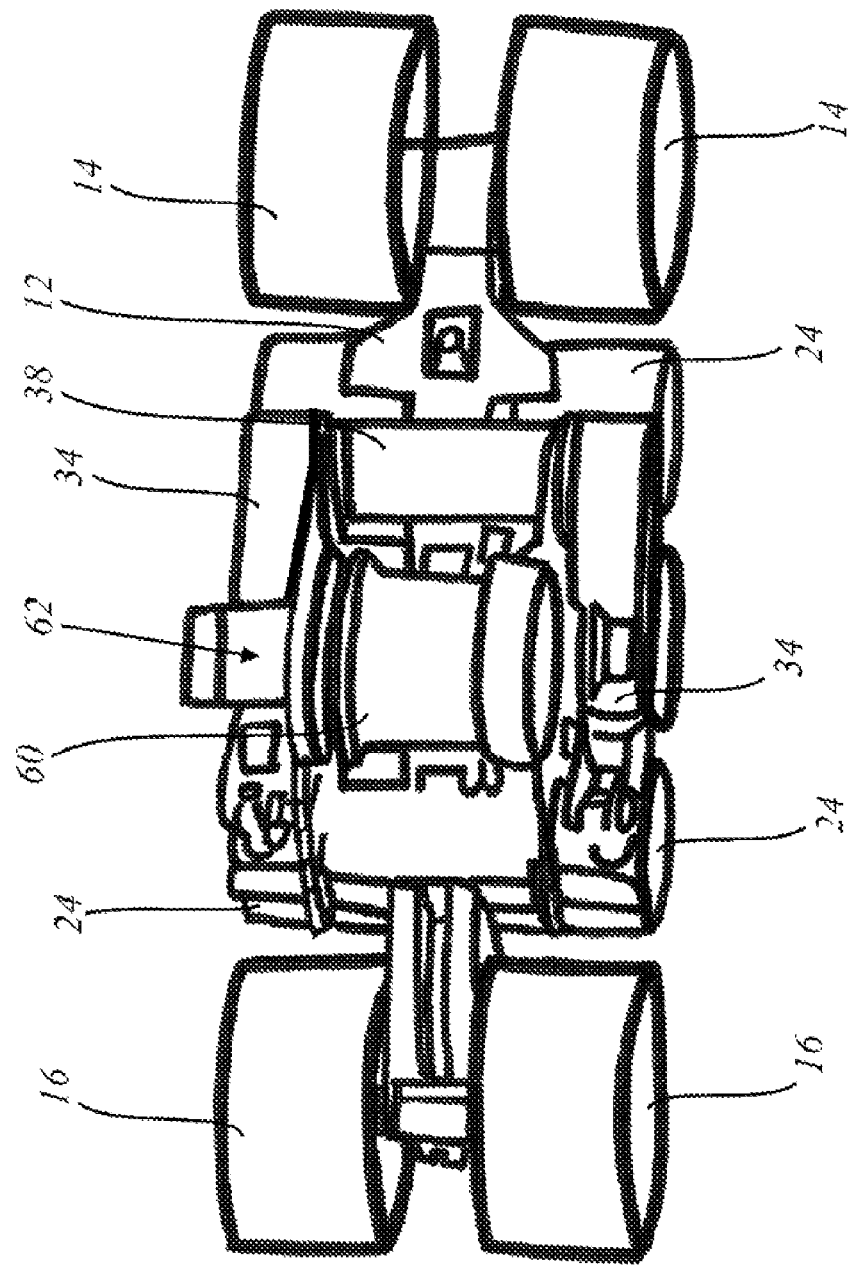
FIG. 7 shows another variant of the embodiment of a belt-band traveling gear according to the present invention, which is equipped with a double rocker for the bearing of a symmetrically designed bogie.

Finally, FIG. 7 shows another variant of the embodiment of a belt-band traveling gear 10 according to the present invention, which belt-band traveling gear is equipped with a double rocker for mounting a symmetrically designed bogie 12. Both the similarly designed and largely symmetrically arranged traveling gear rockers 34 are coupled by means of the common bolt of the rotation axis 38. In the exemplary embodiment illustrated, both the rockers 34 enclose a hydrostatic wheel hub motor 60, which is coupled to a hydrostatic drive system of the vehicle (not illustrated) by means of a connection 62. Alternatively, the drive can also be configured by means of e.g. a switchable planetary gear or any other conventional mechanical method if necessary.

In the variant shown in FIG. 7, the carrier and deflection rollers 14 and 16 and also the carrier rollers 24 are each divided centrally and mounted on the centrally arranged, relatively narrowly designed bogie 12.

The exemplary embodiment shows a spring-mounted, belt-band traveling gear 10 with optimum bearing load specifications, particularly for self-propelling agricultural machines and other off-road vehicles, in which belt-band traveling gear all the small carrier rollers 24 are connected to the bogie 12 by means of an individual rocker 26 in a manner that enables said carrier rollers to rotate about the carrier roller rocker rotation axes 28. Another characteristic is that every carrier roller rocker 26 and thus the small carrier rollers 24 are supported by means of a carrier roller supporting cylinder 30 On each carrier roller rocker 26 towards the bogie 12. The carrier roll supporting cylinders 30 are each mounted on the side of the bogie in the rotation axes 44 of the carrier roller supporting cylinder 30 on the bogie and in the carrier roller rockers 26 in the rotation axis 46. Another characteristic is that the first front deflection and carrier roller 16 and the last rear deflection and carrier roller 14 are each connected to the bogie 12 fixedly or by means of a clamping device with clamping cylinder 18. The number x of the small carrier rollers 24 is to be determined corresponding to the conditions and is always x=n−2 in the case of a total number n of contact rollers. Another characteristic of the traveling gear 10 is that an axle load $F_A$ is transmitted initially in the traveling gear rocker 34 by the traveling mechanism carrying axle 32 via the rotary bearing 36 of the traveling mechanism carrying axle, said rotary bearing being necessary for ground balance. The traveling gear rocker 34 is in turn mounted rotatably on the rotation axis 38 of the traveling gear rocker 34 and is supported on the opposing side by means of one or more traveling gear supporting cylinders 40 against the traveling gear supporting cylinder supporting axle 42.

Since the rotation axis 38 of the traveling gear rocker 34 and the supporting axle 42 of the traveling gear supporting cylinder 40 are a component of the bogie 12 or are connected fixedly thereto depending on technical solutions, the axle load $F_A$ transmitted into the traveling gear rocker 34 is transferred to the bogie 12. The characterizing part is that corresponding to the lever length ratio of the axle load lever length ($L_A$) to the supporting load lever length ($L_S$), the traveling gear support cylinder/s 40 builds up a supporting force $F_{ST}$ on the traveling gear depending on the axle load $F_A$. Here the equation $F_{ST}=F_A \times L_A/L_S$ holds true.

Another characteristic is that for achieving an equalization of the contact force $F_R$ of the carrier and deflection rollers 30, 14, 16, the traveling gear supporting cylinder/s 40 are then interconnected with all the carrier roller supporting cylinders 30 by means of a piping and hose line system 50. Since the contact force $F_R$ of the carrier and deflection rollers is ideally the $n^{th}$ part of the axle load $F_A$ in the case of a number of n contact rollers, the active or working surface areas of the pistons of the traveling gear supporting cylinders 40 must be chosen relative to the active or working surface areas of the pistons of the carrier roller supporting cylinders 30 in such a way that at a system pressure P and taking into account the lever lengths $L_{RS}$ of the carrier roller rockers 26 and the lever length $L_{ST}$ of the carrier roller supporting cylinders 30, a supporting force $F_Z$ results on the carrier rollers 24 which results in a corresponding contact load $F_R$ of the carrier and deflection rollers determined by the equation $F_R=F_A/n$.

Another characteristic is that due to the involvement of the preferably hydropneumatic accumulator 48, a spring effect of the overall system of the belt-band traveling gear is achieved in that the traveling gear rocker 34 and the traveling gear supporting cylinder/s 40 absorb corresponding vibrations.

An additional part of the exemplary embodiment is a spring-mounted, belt-band traveling gear with optimum bearing load specifications which belt-band traveling gear is designed as a triangular traction unit with a, centrally, overhead drive wheel 20, wherein the traveling gear rocker 34 having a rocker width $B_S$ is mounted for installation reasons, i.e. lack of space such that it is offset by a center distance $A_S$ of the rocker from the center of the belt 22. Though the traveling gear rocker 34 then absorbs the corresponding torsion, the interaction of the above-mentioned components is not affected thereby.

In belt-band traveling gears having corresponding installation space due to larger deflection rollers 17 at the front and at the back 15 (cf. FIG. 4), the center distance $A_S$ to the rocker is expediently selected to be smaller, if necessary even equal to zero.

Another part of the exemplary embodiment is a spring-loaded, belt-band traveling gear with optimum bearing load specifications in which belt-band traveling gear, the carrier roller supporting cylinders 30, the traveling gear supporting cylinder/s 40 and the accumulator 48 are interconnected by means of the piping and hose line system of the fluidic system 50 and the valves 52, 54, 56 and 58 in a manner so as to enable the following operating conditions.

A characteristic of an operating condition with active suspension is that all the elements, i.e. the carrier roller supporting cylinders 30, the traveling gear supporting cylinders 40 and the accumulator 48 are connected to one another; the system pressure P is then adjusted accordingly depending on the axle load $F_A$ in the case of a filled system. In the case of varying axle loads $F_A$, a position detection system is expediently integrated in the traveling gear supporting cylinder 40 or assigned thereto so that the system pressure P and thus the stroke can be tracked accordingly. Since these systems are already known from the prior art, these will not be explained in detail.

A characteristic of an operating condition with deactivated suspension is that only the traveling gear supporting cylinder/s 40 are connected to the carrier roller supporting cylinders 30 wherein the valves 52, 54 and 58 are closed. In the system formed between the traveling gear supporting cylinder 40 and the carrier roller supporting cylinders 30, a system pressure P is built up depending on the axle load $F_A$.

There exists another characterizing operating condition when the valves 54 and 56 are closed. Here, the carrier roller supporting cylinders 30 alone are connected to the pressure source and the system pressure P. Thus there no longer exists a dependence of the rocker displacement on the axle load $F_A$. However, it is possible to load the carrier rollers 24 or relieve them of loads in a targeted manner, which could be expedient in certain driving situations. Simultaneously, the accumulator 48 can be connected by means of the valve 52 to the traveling gear supporting cylinder 40 or it can be separated from traveling gear supporting cylinder 40 so that it is possible to drive selectively with or without the suspension.

Naturally, for certain special applications, control systems can also be developed, in which the previously mentioned different operating conditions (switch states of the valves etc.) for every individual traveling gear 10 or for every individual cylinder can be controlled individually.

The characteristics of the invention disclosed in the present description, drawings and claims can be of importance both individually and also in any combinations for implementing the invention in its different design forms. The invention is not restricted to the exemplary embodiments described above. Rather a number of variants and modifications are feasible which utilize the principle according to the invention and are therefore also included within the scope of protection.

LIST OF REFERENCE NUMERALS

10 Belt-band traveling gear
12 Bogie
13 Bogie (V-formation)
14 Rear carrier and deflection roller
15 Rear carrier and deflection roller (V-formation)
16 Front carrier and deflection roller
17 Front carrier and deflection roller (V-formation)
18 Clamping cylinder
20 Drive wheel
22 Belt-band
24 Carrier roller
26 Rocker
28 Rotation axis
30 Supporting cylinder
32 Traveling mechanism carrying axle
34 Traveling gear rocker
36 Rotary bearing 38 Rotation axis
40 Traveling gear supporting cylinder
42 Supporting axle
44 Rotation axis
46 Rotation axis
48 Accumulator
50 Piping/hose line system
52 Valve
54 Valve
56 Valve
58 Valve
60 Wheel hub motor
62 Connection

The invention claimed is:

1. A spring mounted belt-band traveling gear (10), comprising:
  a bogie (12);
  at least two outer deflection rollers (14, 16) respectively mounted for rotation in opposite ends of said bogie (12);
  an endless belt-band (22) engaging a periphery of said outer deflection rollers (14, 16) about which said endless belt-band (22) is disposed;
  a plurality of carrier rollers (24) being mounted along a lower region of said bogie (12) in supporting engagement with a section of said endless belt-band (22) in ground contact between said at least two outer deflection rollers (14, 16);
  a traveling gear rocker (34) having one end mounted to said bogie (12) for pivoting about a rotation axis, said bogie (12) being supported against a frame of a vehicle by a rotary bearing (36) and by a first fluidic suspension or damping unit defined by at least one hydraulic linear traveling gear supporting cylinder (40) coupled between the traveling gear rocker (34) and the bogie and having a pressure corresponding to an applied axle load ($F_A$) being built up against a working surface area of a piston in said at least one cylinder (40);
  each of said plurality of carrier rollers (24) being supported on the bogie (12) by a roller rocker (26) mounted to the bogie for pivoting about a rotation axis (28) and by a second fluidic suspension or damping unit defined by a second hydraulic linear roller supporting cylinder (30) connected between the bogie and the roller rocker;
  said belt-band traveling gear (10) further comprising a fluidic coupling system (50) fluidicly coupling said working surface area of said piston of said at least one hydraulic linear traveling gear supporting cylinder (40) with a working surface area of a piston of each said second hydraulic linear supporting cylinder (30);
  a hydropneumatic accumulator (48);
  said fluidic coupling system (50) being connected to said accumulator (48) and embodying a control arrangement operable for selectively connecting and disconnecting said accumulator to said working surface areas of the respective pistons of the supporting cylinders (30, 40); and
  said piston of said at least one supporting cylinder (40) having a first working surface area so related to a second working surface area of a piston of each said second supporting cylinder (30) and taking into account the lever length ($L_{RS}$) of each roller rocker 26 and the lever length ($L_{ST}$) of each carrier roller supporting cylinder (30) that a contact force ($F_R$) of each of the supporting rollers (24) and each of the deflection rollers (14, 16) corresponds to said axle load ($F_A$) divided by the total number (n) of supporting rollers (24) and deflection rollers (14, 16).

2. The belt-band traveling gear according to claim 1 further comprising a pressure source (P) connected to said at least one supporting cylinder (40), to each said second supporting cylinder (30) and to said hydropneumatic accumulator (48); and
  said control arrangement embodied in said fluidic control system further being selectively operable for disconnecting said pressure source (P) from said at least one supporting cylinder (40), from each said second supporting cylinder (30) or from said accumulator (48).

3. The belt-band traveling gear (10) according to claim 2 wherein said control arrangement embodied in said fluidic control system (50) is selectively operable such that said plurality of second supporting cylinders (30) may be simultaneously disconnected from said accumulator (48) and said pressure source (P).

4. The belt-band traveling gear (10) according to claim 1, wherein an amplitude-dependent variation of a spring rate is provided.

5. The belt-band traveling gear (10) according to claim 1, wherein said traveling gear is designed as a wedge-shaped traveling gear.

6. The belt-band traveling gear (10) according to claim 1, wherein said traveling gear rocker (34) is arranged in a laterally offset manner in relation to the belt-band.

7. The belt-band traveling gear (10) according to claim 1, wherein said control arrangement is embodied in said fluidic control system such that pressure in said fluidic control a system is adjustable.

8. The belt-band traveling gear (10) according to claim 7, comprising means for level control by means of a path sensor at least on a rocker of the bogie and a correspondingly adjustable system pressure.

9. A traveling mechanism for a self-propelled agricultural vehicle, said traveling mechanism comprising at least two belt-band traveling gears (10) constructed according to claim 1, said belt-band traveling gears (10) being arranged on opposite longitudinal sides of the vehicle.

10. A self-propelled agricultural vehicle having a traveling mechanism according to claim 9, which comprises at least two belt-band traveling gears (10) arranged on opposite longitudinal sides of the vehicle.

11. The belt-band traveling gear (10) according to claim 1, wherein the traveling gear (10) is designed as a triangular traction unit.

12. The belt-band traveling gear (10) according to claim 11, wherein said triangular traction unit comprises a central overhead drive wheel.

* * * * *